United States Patent
Nelson et al.

(10) Patent No.: US 8,125,710 B2
(45) Date of Patent: Feb. 28, 2012

(54) UNIQUE COLOR SEPARATION TECHNIQUES FOR STEREOSCOPIC 3D PROJECTION

(76) Inventors: Bradley Nelson, San Rafael, CA (US);
Edmund Sandberg, Monte Sereno, CA (US)

( * ) Notice: Subject to any disclaimer, the term of this patent is extended or adjusted under 35 U.S.C. 154(b) by 154 days.

(21) Appl. No.: 12/422,247

(22) Filed: Apr. 10, 2009

(65) Prior Publication Data

US 2009/0257120 A1    Oct. 15, 2009

Related U.S. Application Data

(60) Provisional application No. 61/043,891, filed on Apr. 10, 2008.

(51) Int. Cl.
G02B 13/00 (2006.01)
G03B 21/14 (2006.01)
(52) U.S. Cl. .......... 359/464; 359/465; 353/7; 353/20; 353/84
(58) Field of Classification Search .......... 359/462, 359/464, 465; 353/20, 7, 84; 351/163
See application file for complete search history.

(56) References Cited

U.S. PATENT DOCUMENTS

| | | | |
|---|---|---|---|
| 5,218,386 A * | 6/1993 | Levien | 351/163 |
| 6,283,597 B1 | 9/2001 | Jorke | |
| 6,899,429 B2 * | 5/2005 | Hamada et al. | 353/20 |
| 7,101,047 B2 * | 9/2006 | Florence et al. | 353/20 |
| 7,959,295 B2 * | 6/2011 | Richards et al. | 353/7 |
| 2009/0231697 A1 * | 9/2009 | Marcus et al. | 359/465 |

* cited by examiner

*Primary Examiner* — Audrey Y Chang
(74) *Attorney, Agent, or Firm* — Steven A. Nielsen; Allman & Nielsen, P.C.

(57) ABSTRACT

Primary colors red, green and blue are each transmitted in three adjacent frequencies to create stereoscopic 3D images. A true center frequency for each primary color is transmitted to one eye while two straddling frequencies, on either side of the center frequency, are transmitted to the other eye. Untinted, notch filtered stereoscopic 3D eyeglasses may be used to segregate light frequencies and direct one channel to each eye of the viewer. A new dual channel laser illumination projection engine may be used to homogenize, condense, combine, and polarize light from red, blue and green lasers to create stereoscopic images suitable for projection on either white of sliver screens.

13 Claims, 3 Drawing Sheets

UNIQUE COLOR SEPARATION TECHNIQUES FOR STEREOSCOPIC 3D PROJECTION

RELATED PATENT APPLICATION AND INCORPORATION BY REFERENCE

This application is a utility application based upon U.S. patent application Ser. No. 61/043,891, entitled "Unique color separation techniques for stereoscopic 3D projection" filed on Apr. 10, 2008. This related application is incorporated herein by reference and made a part of this application. If any conflict arises between the disclosure of the invention in this utility application and that in the related provisional application, the disclosure in this utility application shall govern. Moreover, the inventors incorporate herein by reference any and all patents, patent applications, and other documents hard copy or electronic cited or referred to in this application.

BACKGROUND OF THE INVENTION (1) Field of the Invention

The invention generally relates to means and methods of separating bands or ranges of color space for transmission of stereoscopic images to a screen. More particularly, the invention relates to using RGB natural color ranges as respective middle ranges for one eye, and straddling frequency ranges of each primary color for the other eye.

(2) Description of the Related Art

Several attempts to separate color or project various color schemes to create stereoscopic 3D images are known in the related art. For example, U.S. Pat. No. 6,283,597 assigned to DaimlerChrysler entitled "Method and Facility for Light-Beam Projection of Images on a Screen" discloses the use of Red, Green, Blue, ("RGB") lasers to project two stereoscopic scenes on a screen and wherein viewers are provided with filtered eyeglasses to view one viewing channel in each eye. The DaimlerChrysler method uses side-by-side color ranges to transmit two projections of approximations of each primary color. For example, DaimlerChrysler transmits a light frequency of 450 nm for a right eye view of reddish blue and an adjoining frequency of 475 nm for a left eye view of greenish blue.

Unfortunately, the DamilerChyrsler method of side-by-side light frequency separation requires the use of light frequencies on either side of the RGB naturally occurring frequencies or true RGB frequencies of 630 nm, 532 nm and 470 nm respectively. The color spectrums used in the related art require the use of tinted stereoscopic 3D glasses that cause headaches and distortions due to the need for significant gamma corrections. The related art's failure to project true RGB frequencies leads to distortions in the generation of other colors formed by mixing RGB approximations.

The color spectrums used in the related art require obtrusive measures to block ambient light from the eyes of the viewer. Thus, there is room in the art for improved means of color separation techniques to create a more natural and comfortable stereoscopic viewing experience.

BRIEF SUMMARY OF THE INVENTION

The present invention overcomes shortfalls in the related art by presenting truer representations of each primary color in each stereoscopic viewing channel. In one embodiment, both channels of each primary color are generated by use of a total of three separate wavelength spectrums. Each of the three wavelength spectrums is directly on or just adjacent to the center frequency of the respective primary color.

For example, the center wavelength frequency for the color blue occurs at 470 nm. At this center frequency, the human eye naturally perceives a true blue and ambient light does not unnaturally degrade the viewing of a blue object or a blue image projected upon a screen. The present invention uses a laser light or other light sources to generate the color blue at 470 nm for the "center frequency" or "true primary color frequency", which is directed toward the left eye.

Blue light directed to the right eye comprises two balanced "straddling spectrums" with peaks at 460 nm and 480 nm. By use of two straddling spectrums on either side of the true frequency or center frequency of the primary color, all three frequency spectrums are at or very close to the frequency of the natural primary color. The use of frequencies on either side of the true primary color frequency creates a natural balance between the straddling frequencies that equate to the center frequency. Thus, for the right eye, the mixture of straddling frequencies of 460 nm and 480 nm are reconciled by the brain of the user to a perceived wavelength of 470 nm, the true color or center frequency of blue. The use of straddling frequencies results in no perceived tint in the lens of the stereoscopic glasses. The right eye's perception of a true blue negates the need for headache inducing gamma corrections as found in the DaimlerChrysler method. The use of true or near true primarily colors allows for the addition of ambient light to have no greater adverse effects than ambient light added to a traditional two-dimensional viewing experience.

In one embodiment, in the present example, the invention uses a notch filter on the left lens of the stereoscopic glasses worn by the observer. The left notch lens filter accepts natural blue light at 470 nm and rejects frequencies occurring at a certain range below 470 nm and occurring at a certain range above 470 nm. No tint is needed in the glasses as the natural RGB frequencies are being used. The right notch lens filter rejects the center 470 nm frequency but accepts the straddling frequencies of 460 nm and 480 nm.

The present invention uses narrower and more natural color spaces as compared to the related art. In the present invention, for blue, the total spectrum range is 20 nm for both eyes, spanning from 460 nm to 480 nm with a center frequency of 470 nm, the frequency of a pure or true blue. In the related art, such as the DaimlerChrysler method, for blue, the total spectrum range is 30 nm spread over an off center range spanning between 430 nm and 460 nm. In DaimlerChrysler, the spectrum range for blue is skewed to the lower ranges in an attempt to address contrast and ambient light problems that are solved by the present invention. DaimlerChrysler's skewing of primary colors to the lower spectrums requires the use of tinted glasses and other distracting gamma correction measures; problems that have previously impeded the growth and popularity of stereoscopic 3D viewing systems.

The disclosed light separation "straddle system" is a unique and unobvious departure from the "side-by-side" system taught by the related art. The related art teaches away from the present invention by teaching the use of two wavelength spectrums for each primary color, wherein each of the two spectrums depart away from the center spectrum of its respective primary color. The related art focuses on means and methods of skewing primary colors to allow for stereoscopic color separation and then remixing the altered colors in 3D glasses that are tinted or otherwise distorted with asymmetric laminate systems assist in color correction.

In one embodiment, the invention may be considered an "eight wavelength 3D system" as three wave lengths are generated for blue, three wave lengths are generated for green, and two wave lengths are generated for red, 630 nm for the left eye and 615 nm for the right eye. In an alternative embodiment, a true red for the left eye is transmitted at 630 nm and straddling frequencies of red for the right eye are transmitted at 615 nm and 645 nm.

The present invention overcomes further shortfalls in the related art by producing an enlarged operational color space as compared to the related art.

The invention includes, but is not limited to, novel means and methods of mixing, homogenizing, condensing, and modulating RGB laser outputs to implement the unique stereoscopic color separation methods disclosed in the present invention. While the use of laser light transmission is described and illustrated herein, other means of light generation and light wave frequency separation is contemplated and encompassed by the invention. For example, the invention contemplates the use of wave length or color specific diachronic filters to achieve the unique color separation disclosed by the invention. Also, the use of color wheels and other methods of color projection and/or separation known in the art are contemplated by the invention.

These and other objects and advantages will be made apparent when considering the following detailed specification when taken in conjunction with the drawings.

DETAILED DESCRIPTION OF THE INVENTION

Figure 1:
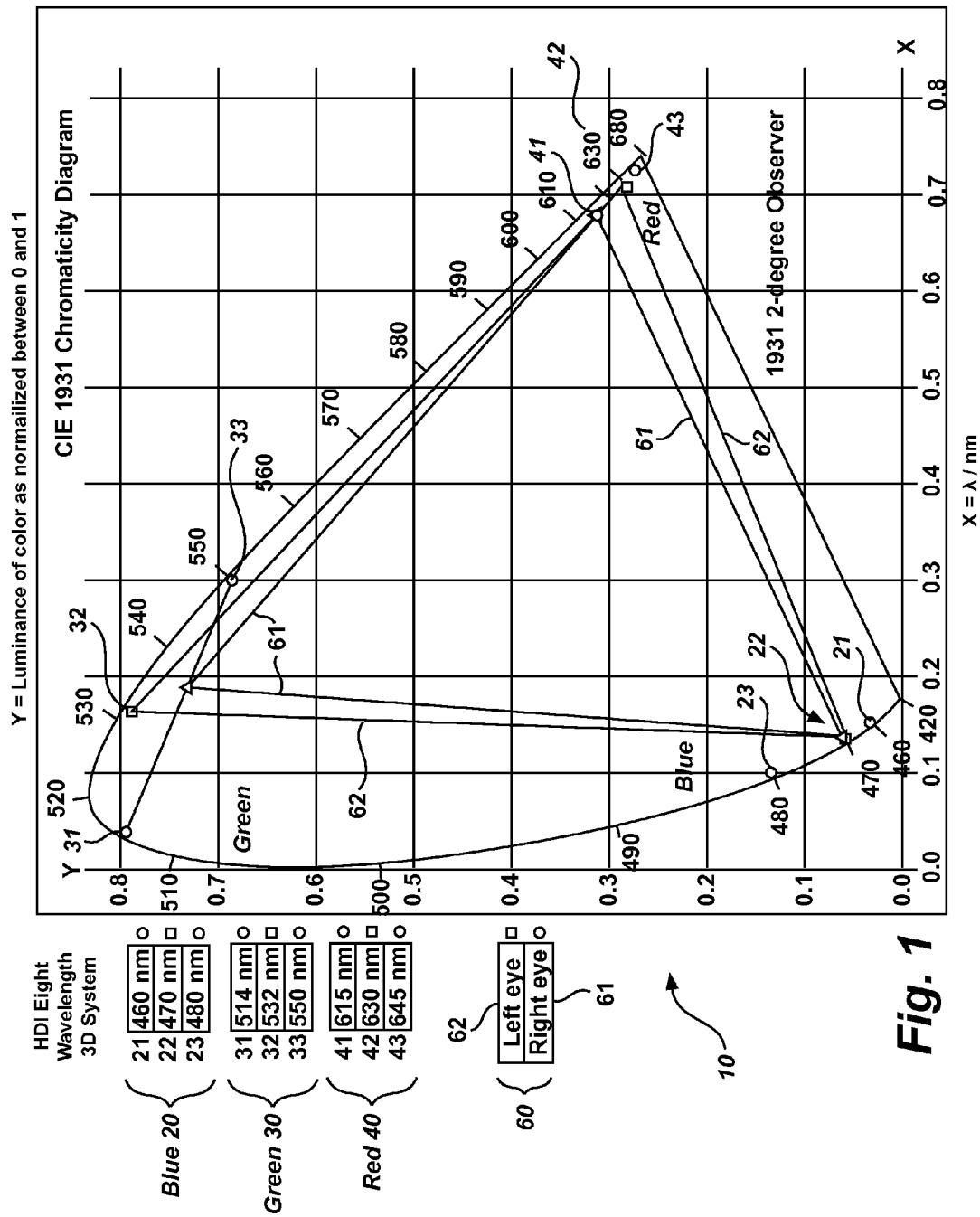
FIG. 1 is a chromaticity diagram showing the operational color space and wavelengths featured in the present invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment nor are separate alternative embodiments mutually exclusive of other embodiments.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The flowing detailed description is, therefore, not to be taken in a limiting sense.

The description, which follows, and the embodiments described therein, are provided by way of illustration of an example, or examples of particular embodiments of the principles of the present invention. These examples are provided for the purposes of explanation, and not of limitation, of those principles of the invention. In the description, which follows, like parts are marked throughout the specification and the drawings with the same respective reference numerals. The drawings are not necessarily to scale and in some instances proportions may have been exaggerated in order to more clearly depict certain features of the invention.

REFERENCE NUMBERS

10 CIE 1931 chromaticity diagram illustrating one embodiment of the invention. The X axis is shown in a range of 0 to 0.8 wherein $X=\lambda/nm$; wherein $\lambda$=the wavelength of the equivalent monochromatic light measured in nanometers. The Y axis is shown in a range of 0 to 0.8 to represent the luminance of color as normalized between 0 and 1.

20 range of frequencies, expressed in nanometers (nm) comprising the color blue 21 a light frequency with a peak of 460 nm, a straddling blue light frequency 22 a light frequency with a peak of 470 nm, the center frequency of blue 23 a light frequency with a peak of 480 nm, a straddling blue light frequency 30 a range of light frequencies, comprising the color green 31 a light frequency with a peak of 514 nm, a straddling green light frequency 32 a light frequency with a peak of 532 nm, the center frequency of green 33 a light frequency with a peak of 514 nm, a straddling green light frequency 40 a range of light frequencies, comprising the color red 41 a light frequency with a peak of 615 nm, a straddling red light frequency 42 a light frequency with a peak of 630 nm, the center frequency of red 43 an optional straddling red light frequency of 645 nm 60 legend showing left eye color space found within outer triangle 62 and right eye color space found within inner triangle 61.

61 sides of inner triangle of chromaticity diagram 10, with the area within inner triangle 61 representing the color space of the straddling frequencies. The vertices of inner triangle 61 are shown as triangles and represent average values of their respective straddling values. For example the straddling values for green are found at 31 514 nm and 33 550 nm and the resulting average is found at the triangle along the line drawn from point 31 to point 33.

62 sides of outer triangle of chromaticity diagram 10. The three vertices of outer triangle 62 are the three center channels, red at 42 630 nm; green at 32 532 nm and blue at 22 470 nm. The three center channel vertices of the outer triangle 62 are marked with a square upon the chromaticity diagram 10.

Figure 2:
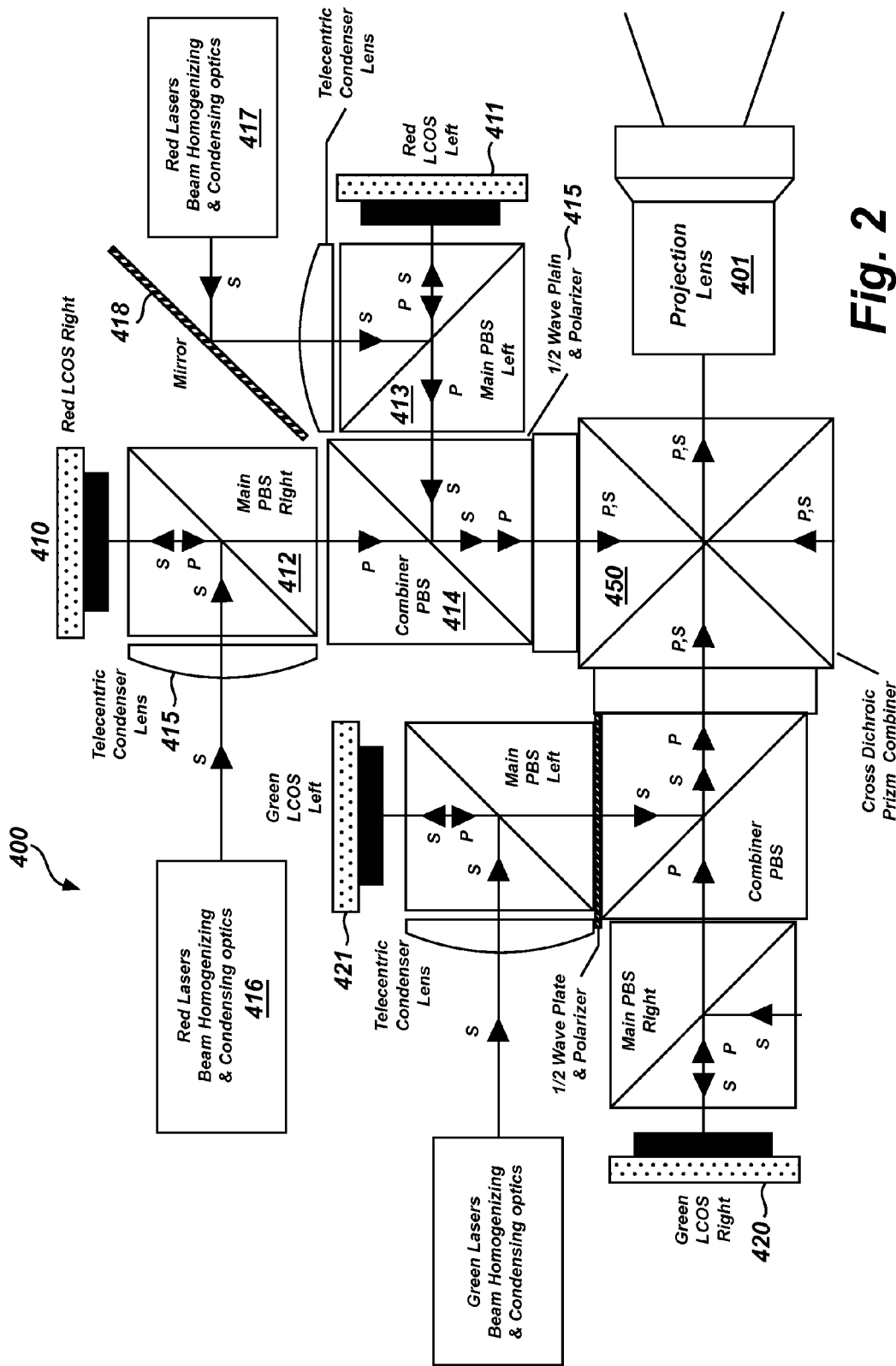
FIG. 2 is block diagram for a dual channel laser illuminated polarized 3D projection engine consistent with the principles of the present invention.
Figure 3:
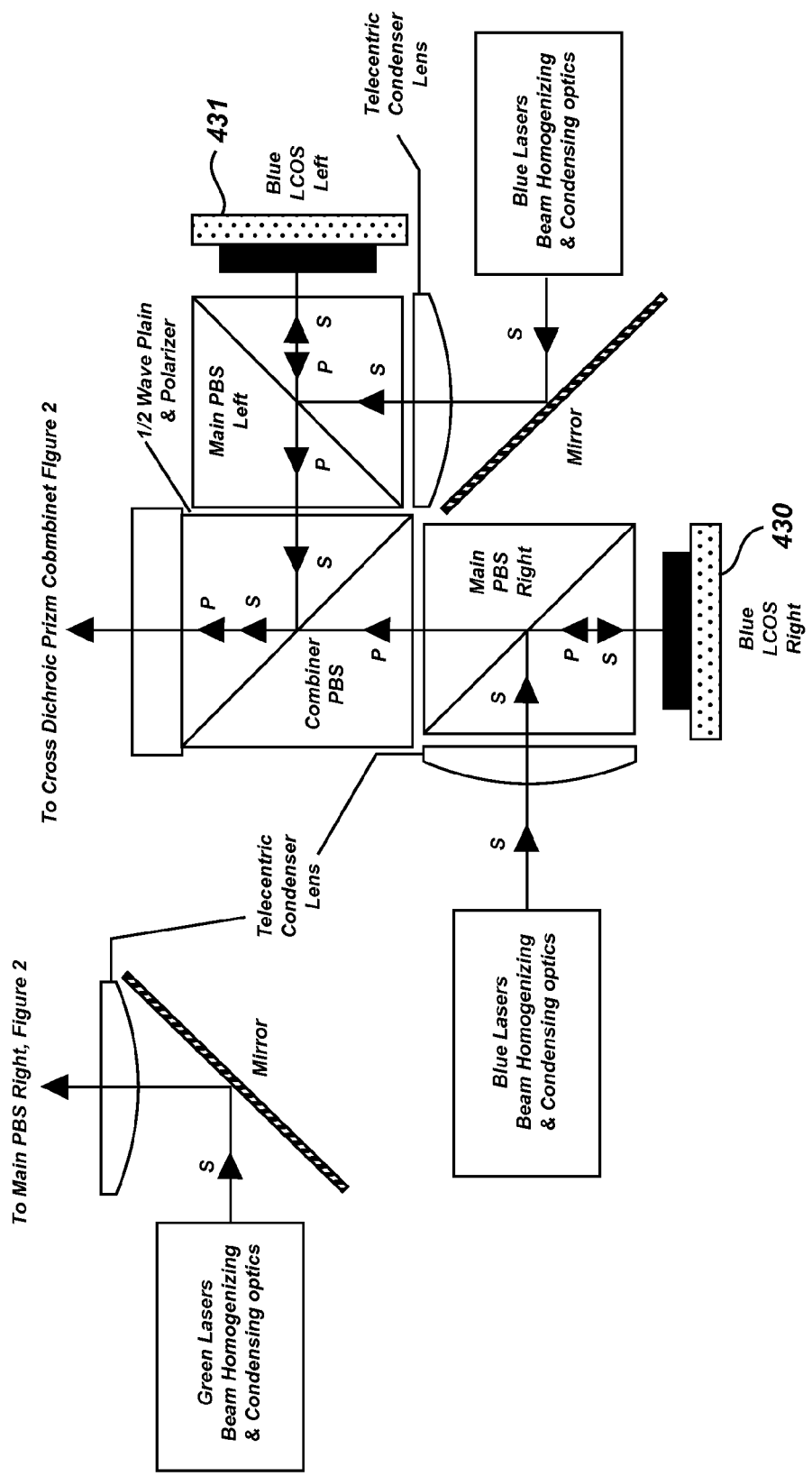
FIG. 3 shows the lower portions of the system of FIG. 2.

400 the components generally of FIG. 2 and FIG. 3

401 single projection lens 410 red LCOS right eye 411 red LCOS left eye 412 red main PBS right eye 413 red main PBS left eye 414 red combiner PBS 415 ½ wave plain and polarizer for first red channel (left)

416 ½ wave plain and polarizer for second red channel (right)

420 green LCOS right eye 421 green LCOS left eye 430 blue LCOS right eye 431 blue LCOS left eye
450 cross dichroic prism combiner
PBS may refer to a polarizing beam splitter
RGB may refer to colors red green blue
LCOS may refer to liquid crystal on silicon Referring to FIG. 1, chromaticity diagram 10 generally illustrates one embodiment of the present disclosure. Three frequencies 20 comprising blue are straddling frequencies 21 460 nm and 23 480 nm for the right eye and center frequency 22 470 nm for the left eye. The range between straddling frequencies 21 460 nm and 23 480 nm is graphically shown in the lower left hand area of the chromaticity diagram by a line drawn between points 21 460 nm and 23 480 nm. The average value of the two straddling frequencies is found at the triangle placed just over and above the square, with the square representing blue center channel 22 at 470 nm. The green and red corners of the chart present center channels 32 and 43 with discernable distance from adjacent triangles, with the triangles representing straddle value averages.

Referring to blocks Blue 20, Green 30 and Red 40, of FIG. 1, circle markers are used to delineate straddling frequencies for the right eye, while square markers are used to delineate center frequencies for the left eye. The designation of center frequencies to the left eye and straddling frequencies to the right eye is arbitrary. The present disclosure contemplates that the three center frequencies could be directed to the right eye and that the five or six straddling frequencies could be directed to the left eye. For purposes of illustration herein, the five or six straddling frequencies are directed to the left eye and the three center frequencies are directed to the right eye.

In an eight wavelength embodiment of the disclosed system, three center frequencies for RGB (red green blue), 630 nm, 532 nm, and 470 nm, respectively, are directed to a viewer's left eye while two straddling frequencies for blue, 460 nm and 480 nm, two straddling frequencies for green 514 nm and 550 nm and one side frequency for red, 615 nm are directed to a viewer's right eye. In a nine wavelength embodiment of the present disclosure, the eight wavelength embodiment is used and a second straddling frequency of 645 nm for red is added.

The center RGB frequencies of 470 nm, 532 nm, and 630 nm may vary or fluctuate by plus or minus two nanometers. The disclosed straddling frequencies may vary or fluctuate by four nanometers in directions away from its related center frequency. For example, the center frequency for blue is 470 nm and may vary or range between 468 nm and 472 nm; while lower straddling frequency of 460 nm may vary downwardly to 456 nm and the upper straddling frequency of 480 nm may vary upwardly to 484 nm.

The area within the sides of the inner triangle 61 found on the chromaticity diagram 10 represents the color space of the straddling frequencies. The three vertices of the inner triangle are derived as an average color value found within each set of straddling values. For example, in the upper area of the chromaticity diagram the two straddling values for green are found at 31 460 nm and 33 550 and points marked 31 and 33 are connected by a straight line. At a point along the line joining points 31 and 33 is a triangle which marks the top vertex of the inner triangle 61. In the present example, the color space within the inner triangle 61 is directed to the right eye.

The outer triangle 62 is defined by three vertices which are found at the three center frequencies of blue 22 470 nm, green 32 532 nm and red 42 630 nm. The color space found within the outer triangle 62 is directed to the viewer's left eye in the present example. The vertices of the outer triangle 62 are marked with a square.

Directing frequencies of light to one eye or the other eye may be accomplished by various means. In one embodiment, circular polarization is used to modulate right eye frequencies and left eye frequencies and eyeglasses with complementary circular polarization are used by viewers to receive one view channel per eye.

Referring to FIG. 2 and FIG. 3, block diagrams demonstrate means of accepting input from red, green and blue lasers to produce two polarized stereoscopic channels using two or three frequencies per primary color. In an alternative embodiment, due to the relative position of red within the visible light spectrum, a true red 42 of 630 nm is generated and polarized for the left eye, while a frequency of near true red 41 of 615 nm is generated and polarized for the right eye. As mentioned above, this embodiment is sometimes referred to herein as the "eight wavelength 3D system". The invention also contemplates the use of a "nine wavelength 3D system" wherein 43 a 645 nm straddling spectrum is added to the right eye channel to view red.

FIG. 2 and FIG. 3 show one projection lens transmitting two separate viewing channels, with each viewing channel being comprised of separate RGB components. In alternative embodiments, more than one output lens is contemplated, and the channels for the right eye and left eye may be inverted. The illustrated embodiment uses linear and/or circular polarization to segregate the two viewing channels. The invention contemplates other means and methods of segregating signals. Components 400 are shown generally in FIG. 2 and in FIG. 3. The components of FIG. 2 and FIG. 3 may reduce spectral peaks.

The present disclosure includes, but is not limited to the following items:

[Item 1] A method of generating stereoscopic 3D images, the method comprising the steps of:
a) transmitting a first viewing channel by use of a center frequency for red of 630 nm, a center frequency for green of 532 nm, and a center frequency for blue of 470 nm; and
b) transmitting a second viewing channel by use of a straddling frequency for red of 615 nm, straddling frequencies for green of 514 nm and 550 nm, and straddling frequencies for blue of 460 nm and 480 nm.

[Item 2] The method of item 1 adding a second straddling frequency for red of 645 nm.

[Item 3] The method of item 1 wherein:
a) the first viewing channel passes through a first notch filter eyeglass that accepts red light at 630 nm, green light at 532 nm and blue light at 470 nm; and
b) the second viewing channel passes through a second notch filter eyeglass that accepts a red light straddling frequency of 615 nm, green light straddling frequencies of 514 nm and 550 nm, and blue light straddling frequencies of 460 nm and 480 nm.

[Item 4] The method of item 3 wherein the second notch filter eyeglass accepts an additional red light straddling frequency of 645 nm.

[Item 5] A system of creating two viewing channels, the system comprising:
a) a first viewing channel comprising a center frequency for red peaking between 628 nm to 633 nm, a center frequency for green peaking between 530 nm and 534 nm, and a center frequency for blue peaking between 468 nm and 472 nm; and
b) a second viewing channel comprising a first straddling frequency for red peaking between 615 nm to 611 nm, a first straddling frequency for green peaking between 514 nm to 511 nm, a second straddling frequency for green peaking between 550 nm to 554 nm, a first straddling frequency for blue peaking between 460 nm to 454 nm and a second straddling frequency for blue peaking between 480 nm to 484 nm.

[Item 6] The system of item 5 including a second straddling frequency for red peaking between 645 nm to 649 nm.

[Item 7] The system of item 5 wherein the center frequencies of the first viewing channel are generated by lasers and modulated by beam homogenizing and condensing optics.

[Item 8] The system of item 7 wherein the straddling frequencies of the second viewing channel are generated by lasers and modulated by beam homogenizing and condensing optics.

[Item 9] The system of item 8 wherein the laser lights comprising the first viewing channel pass through a polarizing beam splitter and then pass through a combiner polarizing beam splitter.

[Item 10] The system of item 9 wherein the laser lights comprising the second view channel pass through a polarizing beam splitter and then pass through a combiner polarizing beam splitter.

[Item 11] A system of accepting two channels of red laser light, two channels of blue laser light, and two channels of green laser light to produce a first polarized viewing channel for one eye and a second polarized viewing channel for a second eye, wherein both viewing channels are projected though one single lens, the system comprising:
a) a first unit of red lasers containing red portions of a first view projected from an first assembly of beam homogenizing and condensing optics 414; sending a signal to,
b) a first red main PBS (polarizing beam splitter) 413, sending a signal to a first Red LCOS (left) 411 and sending the resulting signal to a red combiner 414;
c) the red combiner 414 also receiving a second red laser signal from,
d) a second unit of red lasers containing red portions of a second view projected from a second assembly of bean homogenizing and condensing optics 416, with the second red sent to a second main PBS 412 (right), wherein the signal is processed by a second red LCOS 410 (right) before entering the red combiner PBS 414;
e) the first and second red channels are combined within the red combiner PBS 414, and the combined red signal enters a cross dichroic prism combiner 450,
f) the cross diachronic prism combiner 450 receives a combined first and second green channel and a first and second blue channel wherein each channel undergoes the same processes as described for the two red channels; and
g) the cross diachronic prism combiner 450 combines all input by means suitable for projection though a single lens projector 401.

[Item 12] The system of item 11 wherein each first color channel 417 is modulated through a ½ wave plain and polarizer before entry into its respective combiner PBS 414.

[Item 13] The system of item 12 wherein each main PBS, left and right, 413, 412, is equipped with a telemetric condenser lens 415.

What is claimed is:

1. A method of generating stereoscopic 3D images, the method comprising the steps of:
   a) transmitting a first viewing channel by use of a center frequency for red of 630 nm, a center frequency for green of 532 nm, and a center frequency for blue of 470 nm; and
   b) transmitting a second viewing channel by use of a frequency for red of 615 nm, frequencies for green of 514 nm and 550 nm, and frequencies for blue of 460 nm and 480 nm.

2. The method of claim 1 wherein the second viewing channel includes the use of an additional frequency for red of 645 nm.

3. The method of claim 1 wherein:
   a) the first viewing channel passes through a first notch filter eyeglass that accepts red light at 630 nm, green light at 532 nm and blue light at 470 nm; and
   b) the second viewing channel passes through a second notch filter eyeglass that accepts a red light frequency of 615 nm, green light frequencies of 514 nm and 550 nm, and blue light frequencies of 460 nm and 480 nm.

4. The method of claim 3 wherein the second notch filter eyeglass accepts an additional red light frequency of 645 nm.

5. A system of creating two viewing channels, the system comprising:
   a) lasers for generating a first viewing channel comprising a center frequency for red peaking between 628 nm to 633 nm, a center frequency for green peaking between 530 nm and 534 nm, and a center frequency for blue peaking between 468 nm and 472 nm;
   b) lasers for generating a second viewing channel comprising a first frequency for red peaking between 615 nm to 611 nm, a first frequency for green peaking between 514 nm to 511 nm, a second frequency for green peaking between 550 nm to 554 nm, a first frequency for blue peaking between 460 nm to 454 nm and a second frequency for blue peaking between 480 nm to 484 nm.

6. The system of claim 5 including a second frequency for red peaking between 645 nm to 649 nm.

7. The system of claim 5 wherein the frequencies comprising the first viewing channel pass through a plurality of polarizing beam splitters and then pass through a plurality of combiner polarizing beam splitters.

8. The system of claim 5 wherein the frequencies comprising the second view channel pass through a plurality of polarizing beam splitters with the resulting outputs then passing through a plurality of combiner polarizing beam splitters.

9. A system of accepting two view channels of red laser light, two view channels of blue laser light, and two view channels of green laser light, generated by the system according to claim 5, to produce a first polarized viewing channel for one eye and a second polarized viewing channel for a second eye, wherein both viewing channels are projected through one single lens, the system comprising:
   a) a first unit of red lasers containing red portions of a first view channel projected from an first assembly of beam homogenizing and condensing optics; sending a signal to,
   b) a first red main PBS (polarizing beam splitter), sending a signal to a first red LCOS (left) and sending the resulting signal to a red combiner;
   c) the red combiner also receiving a second red laser signal from;
   d) a second unit of red lasers containing red portions of a second view channel projected from a second assembly of beam homogenizing and condensing optics, with the second red signal sent to a second main PBS (right), wherein the signal is processed by a second LOCS (right) before entering the red combiner PBS;
   e) the first and second red view channels are combined within the red combiner PBS, and the combined red signal of first and second view channels enters a cross dichroic prism combiner;
   f) the cross diachronic prism combiner receives a combined first and second green view channel and a first and second blue view channel wherein each channel undergoes the same processes as described for the two red view channels; and g) the cross diachronic prism combiner combines all inputs into a first view channel and a second view channel for projection through a single lens projector to allow viewing of the projected first view channel and second view channel by use of conventional linear or circular polarized viewing glasses.

10. The system of claim 9 wherein each first color channel is modulated through a ½ wave plate and polarizer before entry into its respective combiner PBS.

11. The system of claim 10 wherein each main PBS, is equipped with a telemetric condenser lens.

12. The system of claim 5 wherein the center frequencies of the first viewing channel are modulated by beam homogenizing and condensing optics.

13. The system of claim 5 wherein the frequencies of the second viewing channel are modulated by beam homogenizing and condensing optics.

\* \* \* \* \*